Jan. 9, 1968            A. BRUEDER            3,362,262
REGULATORS FOR DRIVING AUTOMOTIVE VEHICLES EQUIPPED
WITH INFINITELY VARIABLE-SPEED DRIVE
Filed June 18, 1965
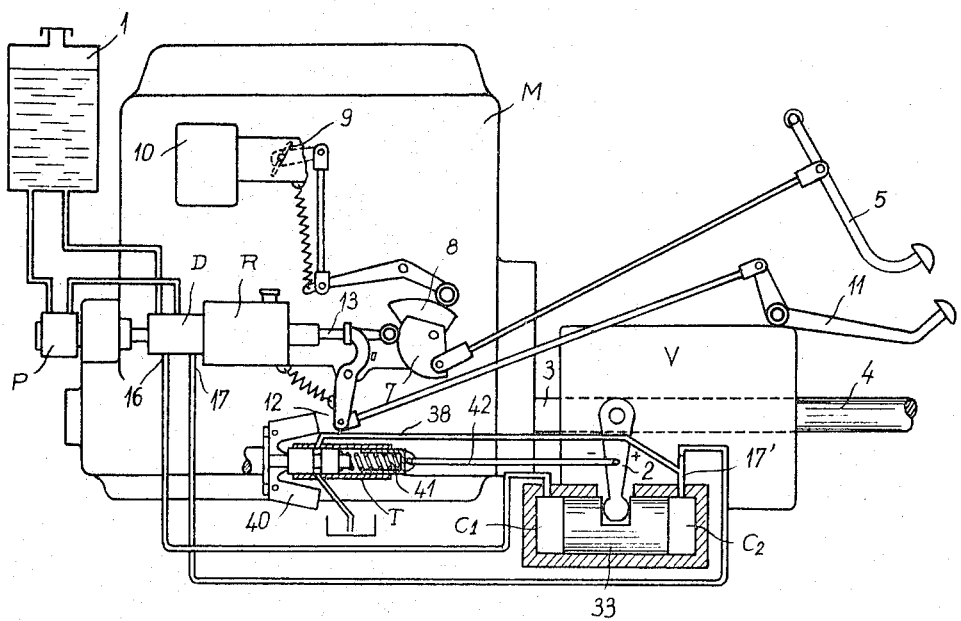
Antoine Brueder,
Inventor
By Wenderoth, Lind & Ponack,
Attorneys

United States Patent Office 3,362,262
Patented Jan. 9, 1968

3,362,262
REGULATORS FOR DRIVING AUTOMOTIVE VEHICLES EQUIPPED WITH INFINITELY VARIABLE-SPEED DRIVE
Antoine Brueder, Paris, France, assignor to Societe Anonyme Andre Citroen, Paris, France, a French corporation
Filed June 18, 1965, Ser. No. 465,050
Claims priority, application France, June 29, 1964, 980,025, Patent 86,033
1 Claim. (Cl. 74—868)

ABSTRACT OF THE DISCLOSURE

An improvement in control means for the operation of a variable speed transmission on a motor vehicle consisting in disposing, in a branch section connecting to a feed reservoir that side of the piston controlling said variable-speed drive which urges said variable-speed drive towards the lowest gear reduction, a slide valve disposed between a set of inertia weights responsive to the engine speed and a spring reacting against a lever connecting said control piston to said variable-speed drive, said spring having a force such that it cannot be compressed unless the engine speed has attained a certain value and that it is compressed home when said speed attains another value considerably higher than said certain value.

---

In the Patent No. 3,036,426 of May 29, 1962, there is described a regulating device for driving automotive vehicles of which the engine is associated with an infinitely variable-speed drive, this device comprising in combination: a centrifugal regulator, a spring acting in antagonism against said regulator, a pump driven continuously for feeding fluid under pressure to a circuit, a distributor responsive to said centrifugal regulator for delivering fluid under pressure on one or the other side of a piston slidably mounted in a cylinder for actuating said variable-speed drive in the proper direction or returning the fluid to the reservoir, and a control member driving a cam for compressing said spring in order to alter the regulator action in the direction desired by the driver of the vehicle.

However, when the engine has already attained a certain speed and the driver suddenly depresses the accelerator for a quick pick-up, it is advantageous that the variable-speed drive be so designed as to provide a certain gear reduction. Similarly, when the driver releases the accelerator pedal it is also advantageous that the variable-speed drive be so disposed that it provides a certain gear reduction, whereby the engine may efficiently brake the vehicle.

This application contemplates an improvement capable of meeting these requirements, which consists essentially in providing, between the proper side of the cylinder controlling the variable-speed drive and the reservoir, a pipe line in which a slide valve is interposed, this slide valve being responsive on one side to the action of a centrifugal device and on the other side to a coil compression spring reacting against a rod pivoted on the variable-speed drive control lever.

The force of this spring is such that it cannot be compressed by the centrifugal device below a predetermined minimum engine speed and that it is compressed home when another speed limit considerably higher than said minimum speed is attained.

Thus, as long as the engine speed is inferior to the aforesaid minimum value the variable-speed drive remains in its highest gear position, that is to say, the position giving the lowest reduction between engine and driving wheels; at engine speeds intermediate said minimum speed and said considerably higher speed, the variator assumes a well-defined position for each speed value, and when the engine speed exceeds said higher value the variable-speed drive is again responsive to the regulator as described in the said patent.

The invention will now be described with reference to the attached drawing illustrating diagrammatically the device of the said patent modified according to the present invention.

It may be briefly reminded that in the said patent the regulator for driving automotive vehicles having the engine M associated with a variable-speed drive V comprises a centrifugal regulator R provided with a hydraulic distributor D. This distributor is fed by a pump P and controls the delivery of fluid under pressure into one of the receiver cylinders C1, C2 controlling the variator V and at the same time the discharge from the other cylinder, the double-acting piston mounted in these cylinders C1, C2 acting upon a lever 2 controlling the variation in gear ratio between the input shaft 3 and the output shaft 4. The pedal 5 is adapted to actuate a cam 7 of which each angular position provides a specific adjustment of the regulator R. Of course, a detailed description of this arrangement is available in the aforesaid patent.

According to this invention there is added to a branch section 38 of pipe line 17 connecting the distributor D to the cylinder C2 a slide valve T adapted to connect this branch section to the reservoir or, in other words, to provide a leak exhaust for the cylinder C2.

This slide valve is mounted between a set of inertia weights 40 providing a thrust as a function of the square of the engine speed and a spring 41 reacting against a rod 42 pivoted on the lever 2 controlling the adjustment of the regulator; in the drawing, the sign + designates the direction of movement of lever 2 which provides the highest gear reduction through the variable-speed drive and the sign − the direction of movement of said lever which provides the lowest gear reduction through said variable-speed drive.

As already explained, the force of said spring 41 is so calculated that it cannot be compressed by the set of inertia weights below a minimum engine speed, and that it is compressed home when this speed attains another value considerably higher than said minimum speed, the spring being on the other hand so mounted that it is compressed home when the piston 33 is in the position corresponding to the lowest gear reduction given by the variable-speed drive.

In operation, with the engine idling and the regulator component elements positioned as shown in the figure, it will be seen that in spite of the fact that the distributor D delivers fluid to the cylinder C2 in the direction assumed to provided the lowest gear reduction, the leakage provided by the slide valve will keep the variable-speed drive in the same position until the inertia weights 40 (when the engine speed has exceeded the aforesaid minimum or first limit) move said slide valve and cut off the branch section 38; however, due to the state of balance arising between the spring and the set of inertia weights to each engine speed between the aforesaid two limits there corresponds a well-defined position of the variable-speed drive, until the engine speed exceeds the aforesaid upper value and the variable-speed drive takes a position providing the lowest gear reduction.

Similarly, it is clear that wwhen the driver releases the accelerator pedal, the engine speed drops rapidly to a value inferior to said minimum speed whereby the spring 41 is allowed to expand and communicates the fluid in branch section 38 to the reservoir, thus returning the variable-speed drive to the position giving the highest gear reduction.

It is clear that with this arrangement the regulator improves the vehicle pick-up characteristics while maintaining the variable-speed drive in its lowest gear-reduction position as long as the engine has not attained a speed greater than a certain value, and that an efficient braking action can be obtained from the engine since the release of the accelerator pedal moves the variable-speed drive to its position providing the highest gear reduction.

What is claimed is:

1. Improvement in control means for the operation of a variable speed transmission on a motor vehicle comprising the combination with the engine and the main drive shaft of said engine of a transmission device providing a continuously variable speed ratio interposed therebetween, a speed sensitive governor driven by said engine, a speed ratio control device operatively connected with said transmission, means for supplying fluid under pressure by said engine for operating said speed ratio control device, a distributor controlled by said governor controlling the supply of fluid to said speed ratio control device to vary the transmission ratio, and a cam under the control of the operator of the vehicle to modify the action of said distributor in varying the transmission ratio, said improvement consisting in disposing, in a branch section connecting to a feed reservoir that side of the piston controlling said variable-speed drive which urges said variable-speed drive towards the lowest gear reduction, a slide valve disposed between a set of inertia weights responsive to the engine speed and a spring reacting against the lever connecting said control piston to said variable-speed drive, said spring having a force such that it cannot be compressed unless the engine speed has attained a certain value and that it is compressed home when said speed attains another value considerably higher than said certain value.

References Cited

UNITED STATES PATENTS

| | | | |
|---|---|---|---|
| 3,036,426 | 5/1962 | Brueder | 60—19 |
| 3,202,012 | 8/1965 | Jania | 74—472 |
| 3,225,618 | 12/1965 | Page | 74—472 |
| 3,256,747 | 6/1966 | Kempson | 74—472 |
| 3,283,606 | 11/1966 | Brueder | 74—472 |

DONLEY J. STOCKING, *Primary Examiner.*

H. S. LAYTON, *Assistant Examiner.*